March 27, 1934. W. H. NICHOLS ET AL 1,952,884
COMPOSITE PULLEY
Filed Jan. 23, 1932   2 Sheets-Sheet 1

William H. Nichols
Bernard H. Dow
INVENTORS

BY Chas. Silver
ATTORNEY.

March 27, 1934.  W. H. NICHOLS ET AL  1,952,884
COMPOSITE PULLEY
Filed Jan. 23, 1932   2 Sheets-Sheet 2
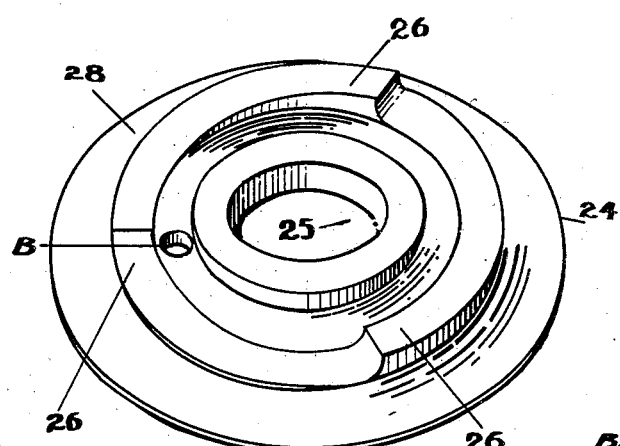
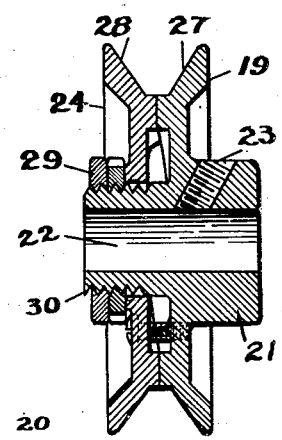
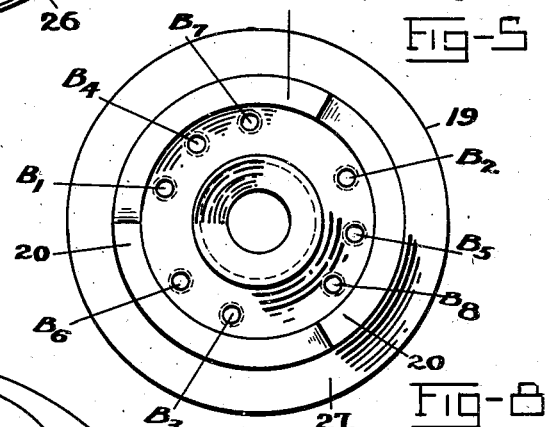
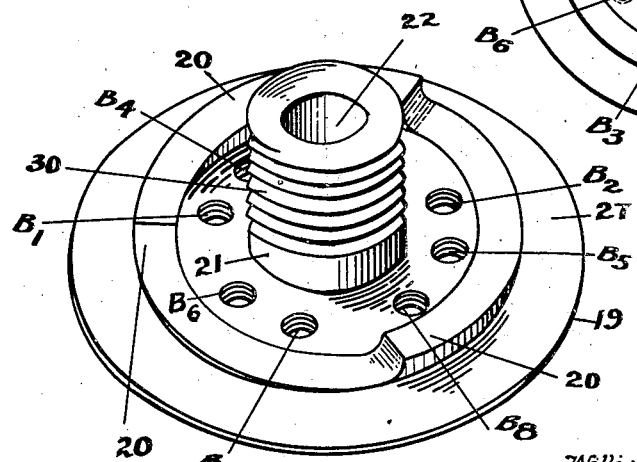
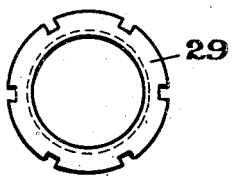
William H. Nichols
Bernard R. Dow.  INVENTORS
BY
Chas. Silver
ATTORNEY.

Patented Mar. 27, 1934

1,952,884

UNITED STATES PATENT OFFICE 1,952,884

COMPOSITE PULLEY

William H. Nichols, Waltham, Mass., and Bernard H. Dow, Baltimore, Md., assignors to May Oil Burner Corporation, a corporation of Maryland Application January 23, 1932, Serial No. 588,414

7 Claims. (Cl. 64—8)

This invention relates to improvements in belt pulleys and has particular reference to power-transmitting-pulleys with peripheral tapering grooves of substantially V-section.

In many installations involving power-driven mechanisms, it is highly desirable and frequently essential to secure the driving and driven shafts in permanent positions and in fixed relation to each other. Where belts and pulleys are employed to deliver the power from one of these fixed shafts to the other, there is a well recognized need of a ready and efficient means for properly adjusting the tension of the belt without changing its length. If the belt is too tight or too loose, not only will the operation of the mechanism be noisy but also less efficient owing to the loss in power and inability to transmit the full power from the drive shaft to the driven shaft.

Among the objects of this invention is to provide a composite pulley having a peripheral groove with inwardly sloping sides and of approximately V-section, the pulley being adjustable to allow variation in width of the groove with consequent variation in tension of the belt. As the peripheral groove is widened the tension of the belt will decrease because the belt will move closer to the axis of the pulley but as this groove is narrowed the belt will be forced toward the periphery of the pulley and with a corresponding increase in the tension of the belt.

A further object of this invention is to provide means for varying the width of the peripheral groove of the composite pulley without disturbing the position of the shaft and to accomplish this variation in an efficient, convenient and simple manner.

Other, further and more specific objects of this invention will become readily apparent to persons skilled in the art from a consideration of the following description when taken in conjunction with the accompanying drawings wherein:

Fig. 5 is a longitudinal cross section of a modified form of composite pulley with the plate members at minimum separation from each other and in operative position.

Figs 6 and 7 are perspective views of the plate members of the composite pulley shown in Fig. 5 and illustrating the disposition of the spacing projections.

Fig. 8 is a plan view of the plate member shown in Fig. 7 and illustrating the distribution of the bores for receiving the locking members or screws for the various degrees of variation of the peripheral groove.

Fig. 9 is a side view of a lock nut on the composite pulley shown in Fig. 5.

Figure 3:
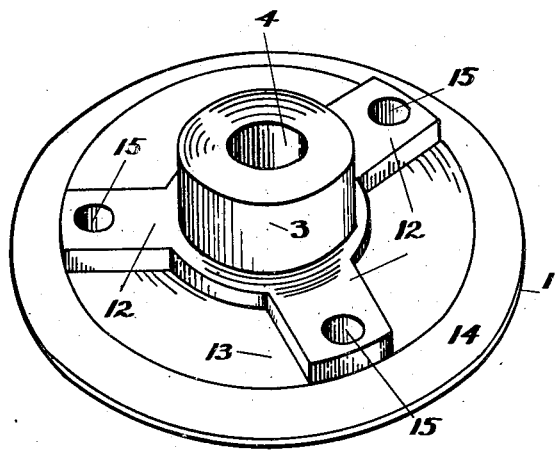
Figs. 3 and 4 are perspective views of the plate members shown in Figs. 1 and 2 and illustrating the distribution of the spacing projections.
Figure 1:
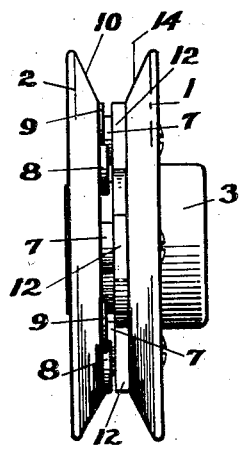
Fig. 1 is a side elevation of the composite pulley in operative position with the plate members disposed at maximum separation from each other.
Figure 4:
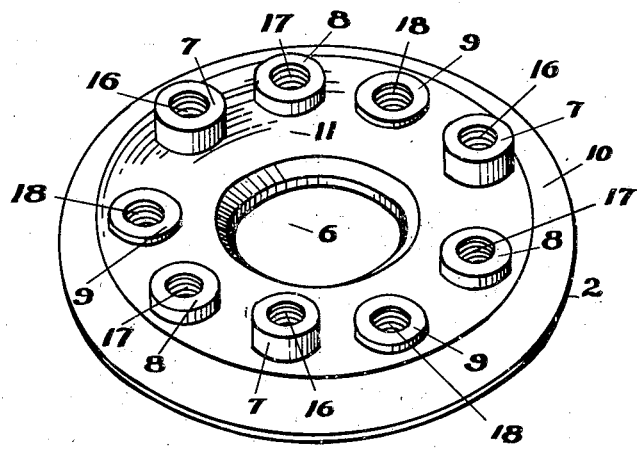
Figure 2:
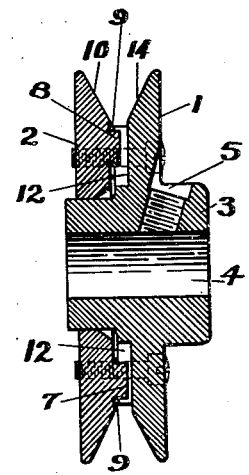
Fig. 2 is a longitudinal cross section of the device shown in Fig. 1, with the plate members disposed at the minimum separation from each other and in operative position.

The composite pulley shown in Figs. 1 to 4 comprises the plate members 1 and 2 bevelled at their peripheries to form a tapering V groove of substantially V section when placed next to each other in operative position. The plate member 1 is provided with the boss 3 having a shaft bore 4 and the set screw 5 for fixing or keying this plate member to the shaft. The plate member 2 has the bore 6 and is adapted to fit over the boss 3 of the plate member 1 so that these two plate members will be co-axial. This plate member 2, as shown in Fig. 4, is provided with three sets of stepped projections 7, 8 and 9 having their faces substantially perpendicular to the axis of this plate member and disposed at a lesser distance from this axis than the bevelled portion 10. The faces of projections 7 are substantially in the same plane, the faces of projections 8 are also in substantially the same plane and likewise the faces of projections 9 are in substantially the same plane, the plane of the faces of projections 8, which are of intermediate size, lying between the planes of the faces of projections 7 and faces of projections 9. It is preferable to have the projections 7, 8 and 9 integral with the plate member 2 and, if the face 11 upon which these projections are disposed is in a plane substantially perpendicular to the axis of the plate, the projections in each of the sets designated by the reference numerals 7, 8 and 9 will be of substantially equal thickness, the thickness of projections 8 being intermediate those of projections 7 and 9.

The plate member 1, as shown in Fig. 3 is provided with three projections 12 having their faces substantially in the same plane and perpendicular to the axis of this plate member. These projections 12 are preferably integral with plate member 1, and if the face 13 upon which these projections are disposed is in a plane perpendicular to the axis of the plate, these projections 12 will be of equal thickness. In order that these plate members shall effectively cooperate with each other in the various positions for regulation of the width of the peripheral groove, the thickness of every one of the projections 12 shall be at least equal to and preferably slightly greater than the distance between the plane of the faces on projections 7 and the plane of the faces on projections 9 of plate member 2.

The projections 7, 8 and 9 are preferably equidistant from the axis of the plate member 2 and in each set the projections of substantially equal thickness are practically equidistant from each other, the centers of the projections in each set being substantially at the vertices of an equilateral triangle having its center traversed by the axis of the plate member. The projections 12 on plate member 1 are substantially equidistant from each other and extend toward the tapered portion 14 of the plate member a sufficient length to insure contact with the projections on plate member 2 when these plate members are assembled in operative position. The projections 12 are of width to adequately contact at any one time with only one set of projections on plate member 2.

This distribution of the projections upon the plate members 1 and 2 greatly facilitates the assembly, because contact of any one of the three projections 12 with a projection of any thickness on plate member 1 will result in simultaneous contact of the other two projections 12 with the two other projections on plate member 2 of the same thickness. By assembling the plate members in operative position so that projections 12 are in contact with projections 7, the peripheral tapering groove will be at the greatest width, an intermediate width of the peripheral groove is obtained by contact of projections 12 with projections 8, while the minimum width of peripheral groove results with projections 9 in contact with projections 12.

In order to secure the plate members 1 and 2 in fixed rigid relation to each other for the several regulations of width of the peripheral groove, there are provided bores 15 in plate member 1 for receiving locking members, such as bolts or screws, and corresponding bores 16, 17 and 18 in plate member 2 adapted to register with bores 15 at each regulation of width of peripheral groove when spacing projections on one plate member are in operative contact with those of the other. A convenient arrangement consists in having all bores 15, 16, 17 and 18 equidistant from the axis of the pulley, the bores 15 equidistant from each other, and the equidistant spacing of bores in each set designated by the reference numerals 16, 17 and 18. Some or all of these bores 15, 16, 17 and 18 may be internally threaded for engagement with threaded locking members.

In the modification illustrated in Figs. 5 to 8, the plate member 19 is provided with three projections 20, the faces of which are obliquely inclined to the axis of the plate member. This plate member 19 is provided with a boss 21 having a shaft bore 22 and the set screw 23 for fixing or keying this plate member to the shaft. The plate member 24 has the bore 25 and is adapted to fit over the boss 21 of plate member 19 so that these two plate members will be co-axial. The plate member 24 is also provided with three projections 26 similar to projections 20 and having their faces obliquely inclined to the axis of the plate member and disposed at the same distance from the axis as the projections 20. The projections on these plate members are preferably integral with the plate members and so disposed that when the plate members are brought together in the position of minimum width of the peripheral tapering groove formed by the bevels 27 and 28 as shown in Fig. 5, the highest point of one projection will be against the lowest point of an opposite projection of the other plate member. When in this position, the peaks of the projections will prevent circumferential movement of the plate members 19 and 24 relative to each other in one direction but will allow circumferential movement of these plate members relative to each other in the other direction, the inclined faces on the projections admitting of a gradual relative circumferential movement of the plates resulting in a gradual widening of the peripheral groove as the peaks of the projections are brought nearer to each other. By this arrangement of projections with faces obliquely inclined to the axis of the plate members, the width of the peripheral groove may be regulated for any degree from minimum to maximum limits.

In order to secure the plate members 19 and 24 in fixed relation to each other at each regulation of width of the peripheral groove, one or more lock nuts 29, shown in Fig. 9, are employed, engaging the threaded portion 30 of the boss 21. These lock nuts 29 are effective in preventing circumferential movement of the plate members 19 and 24 relative to each other in both directions when these plate members are in the extreme position of minimum width of peripheral groove, as shown in Fig. 5. However, at other regulations of width of the peripheral groove, the circumferential movement of the plates relative to each other is adequately arrested by these lock nuts 29 in only one direction; that is, widening of the peripheral groove is checked by preventing the peaks of the opposing projections from nearing each other, but separation of the peaks of the opposing projections is not effectively prevented. To overcome this and rigidly fix the relationship of the plate members 19 and 24 at regulations other than the extreme position of minimum width of peripheral groove, there are provided, in addition to the lock nuts 29, a series of bores in one plate member adapted to register and coact with one or more bores in the other plate member for receiving locking members, such as bolts or screws. Some or all of these bores may be internally threaded for engagement with threaded locking members.

The plate member 24 is shown provided with one of these bores B while plate member 19 has eight bores $B_1$, $B_2$, $B_3$, $B_4$, $B_5$, $B_6$, $B_7$, and $B_9$, adapted to register with bore B at the eight successive stages of peripheral groove width in excess of the minimum. It has been found convenient to locate the bores for each successive stage in the sector containing the next projection, as shown in Fig. 8.

It will be readily seen that by providing plate member 24 with two bores properly disposed instead of the single bore B, there can be obtained sixteen stages of peripheral groove adjustment in addition to that representing the minimum width in lieu of the eight additional stages with bore B alone. By following this procedure of increasing the bores in either one or both of the plate members the number of stages of peripheral groove adjustment of width may be multiplied at will. With a given number of bores in the coacting plate members, the modification shown in Figs. 5 to 8 lends itself to a much greater number of peripheral groove width adjustments than that shown in Figs. 1 to 4.

The use of bores and locking members positioned therein as auxiliary means to the lock nuts 29 for rigidly securing the plate members 19 and 24 in fixed relation to each other is preferable to providing the faces of projections 20 and 26 with ridges, corrugations or other irregularities because the latter means is not as efficient as the former and involves greater cost of manufacture.

In using either modification of this composite pulley, the plate member having the boss is keyed to the shaft at the desired position, and the other plate member is adjusted thereon so that the proper projections are brought together to provide the desired width of peripheral groove. The locking screws are bolts are then placed in the bores which are in registry with each other. With the modification shown in Figs. 5 to 8, the lock nuts are also applied. If desired, the parts may be assembled prior to placing on the shaft. When it is desired to change the width of the peripheral groove, it is not necessary to remove the composite pulley from the shaft, because the adjustment may be made by simply disengaging the locking members holding the plate members together, moving the plate members in circumferential relation to each other until the opposing projections give the desired peripheral groove width, and then locking the plate members for the new regulation.

This new composite pulley finds special application for use with belts of V-section, and affords a ready means for increasing or decreasing the tension of the belt without disturbing the position of the pulley on the shaft. However, this new device may be used to advantage with belts of other cross sections, for example, circular, trapezoidal, etc. This new composite pulley has been found of particular value for use with power-driven mechanism where reliable regulations of speed are sought, for example, in oil-burner installations employing pumps for delivery of oil under proper pressure to the atomizer.

In the specific illustrations shown herein, it will be noted that in each modification the projections on the opposing plate members are in contact at three places for each regulation. This represents the minimum for proper stability. However, instead of three places of contact, four or more may be provided. An increase in number may be found desirable with pulleys of large diameter. Also, instead of having only one side of the plate members bevelled at the periphery and spacing projections thereon, either or both of these plate members may be bevelled on the other side too and provided with projections on such other side that will afford additional adjustments of width of peripheral groove.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

We claim as our invention:

1. A composite pulley having a pair of plate members bevelled at their peripheries and co-operating to form a tapering peripheral groove, means for regulating the width of said groove, said means comprising projections of unequal thickness upon a face of one of said plate members coacting with projections on a face of the other plate member and means for locking said plate members in fixed relation to each other for each regulation.

2. A composite pulley having a pair of plate members bevelled at their peripheries and co-operating to form a tapering peripheral groove, means for regulating the width of said groove, said means comprising projections upon the face of one plate member extending to unequal distances from said face and coacting with projections of substantially equal thickness on the face of the other plate member and said projections on each plate member being positioned at a lesser radial distance from the axis of the pulley than that of the base of the peripheral groove; and means for locking said plate members in fixed relation to each other for each regulation.

3. A composite pulley having a pair of coaxial plate members bevelled at their peripheries and co-operating to form a tapering peripheral groove, means for regulating the width of said groove, said means comprising sets of projections upon one of said plate members coacting with projections on the other plate member, the projections in each set having their faces in stepped relation to each other and each face of the projections in one set being in substantially the same plane as a face of a corresponding projection in another set, and means for locking said plate members in fixed relation to each other for each regulation.

4. A composite pulley having a pair of coaxial plate members bevelled at their peripheries and co-operating to form a tapering groove, means for regulating the width of said groove, said means comprising sets of projections upon one of said plate members coacting with projections on the other plate member, the projections in each set of the first-named plate member having their faces in stepped relation to each other, each face of the projections in one set being in substantially the same plane as a face of a corresponding projection in another set and the difference between the extent of projection of the face of least projection and that of greatest projection in each set being no greater than the thickness of every projection on the other plate, and means for locking said plate members in fixed relation to each other for each regulation.

5. A composite pulley having a pair of coaxial plate members bevelled at their peripheries and co-operating to form a tapering peripheral groove, means for regulating the width of said groove, said means comprising sets of projections upon one of said plate members coacting with projections on the other plate member, the projections in each set having their faces in substantially the same plane and in stepped relation to the faces of the projections in each other set and disposed at substantially the same radial distance from the axis of the pulley and each projection being at substantially the same distance from the adjacent projection of its set and means for locking said plate members in fixed relation to each other for each regulation.

6. A composite pulley having a pair of plate members bevelled at their peripheries and co-operating to form a tapering peripheral groove, means for regulating the width of said groove, said means comprising projections of unequal thickness upon a face of one of said plate members coacting with projections of substantially equal thickness on a face of the other plate member and bores in one plate member registering with bores in the other plate member when the projections of one plate member are in operative contact with that of the other for receiving locking means to secure the plate members in fixed relation to each other for each regulation.

7. A composite pulley having a pair of co-axial plate members bevelled at their peripheries and co-operating to form a tapering peripheral groove, means for regulating the width of said groove, said means comprising sets of projections upon one of said plate members coacting with projections on the other plate member, the projections in each set having their faces in substantially the same plane and in stepped relation to the faces of the projections in each other set and disposed at substantially the same radial distance from the axis of the pulley and each projection being at substantially the same distance from the adjacent projection of its set and bores in one plate member registering with bores in the other plate member when the projections of one plate member are in operative contact with that of the other for receiving locking means to secure the plate members in fixed relation to each other for each regulation.

WILLIAM H. NICHOLS.
BERNARD H. DOW.